United States Patent [19]
Ostrowski

[11] Patent Number: 6,059,498
[45] Date of Patent: May 9, 2000

[54] LINE TENSIONING APPARATUS AND METHOD

[76] Inventor: Michael E. Ostrowski, 29 Oak Springs Dr., San Anselmo, Calif. 94960

[21] Appl. No.: 08/974,540

[22] Filed: Nov. 19, 1997

[51] Int. Cl.[7] .................................................. B60P 7/08
[52] U.S. Cl. .............................. 410/100; 410/34; 410/97; 410/104; 296/3
[58] Field of Search .................................. 410/34–36, 96, 410/97, 100, 104; 243/499; 224/405, 534, 568; 24/129 A, 136 K, 68 CD; 296/3

[56] References Cited

U.S. PATENT DOCUMENTS

| | | |
|---|---|---|
| 1,713,238 | 5/1929 | Otte . |
| 2,628,397 | 2/1953 | Olson . |
| 3,279,759 | 10/1966 | Tallman . |
| 4,011,974 | 3/1977 | Scarola . |
| 4,174,119 | 11/1979 | Biles . |
| 4,223,869 | 9/1980 | Patterson, III et al. . |
| 4,314,783 | 2/1982 | Parnell et al. ............................. 410/34 |
| 4,510,652 | 4/1985 | van Iperen . |
| 4,900,203 | 2/1990 | Pope ......................................... 410/36 |
| 5,338,136 | 8/1994 | Hetchler ................................. 410/100 |
| 5,385,435 | 1/1995 | Musta ..................................... 410/102 |
| 5,941,666 | 8/1999 | Waters ................................... 410/100 |

Primary Examiner—Stephen T. Gordon
Attorney, Agent, or Firm—Flehr Hohbach Test Albritton & Herbert LLP

[57] ABSTRACT

Line tensioning apparatus and method in which a slide is movable in first and second directions along an elongated bar, with a one-way brake on the slide engaging the bar and preventing movement of the slide in the second direction. The line is secured to the slide and then pulled to draw the slide in the first direction to tension the line, with the brake holding the slide where it is drawn to maintain tension in the line.

19 Claims, 4 Drawing Sheets

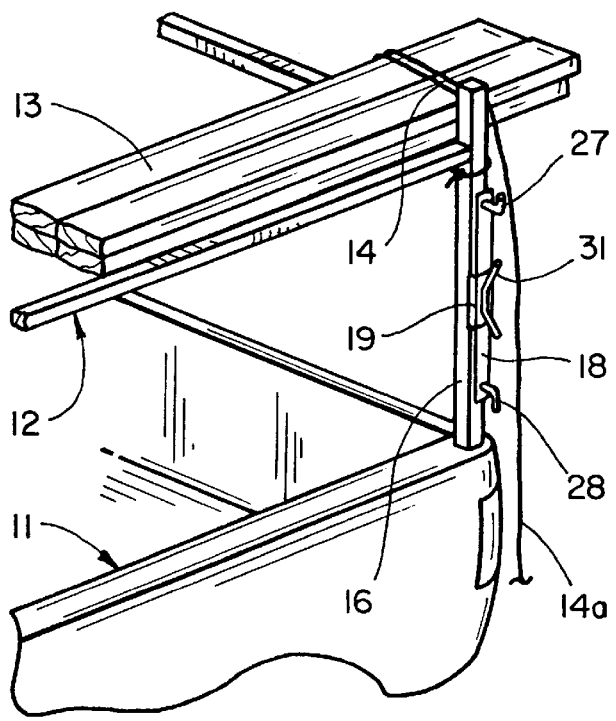
FIG_1
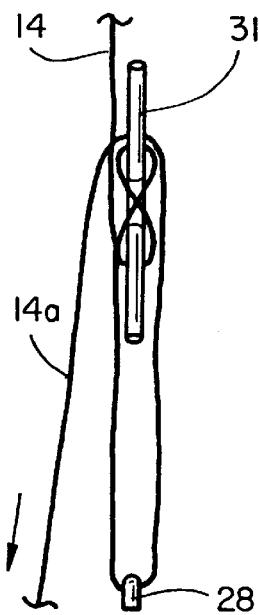
FIG_9
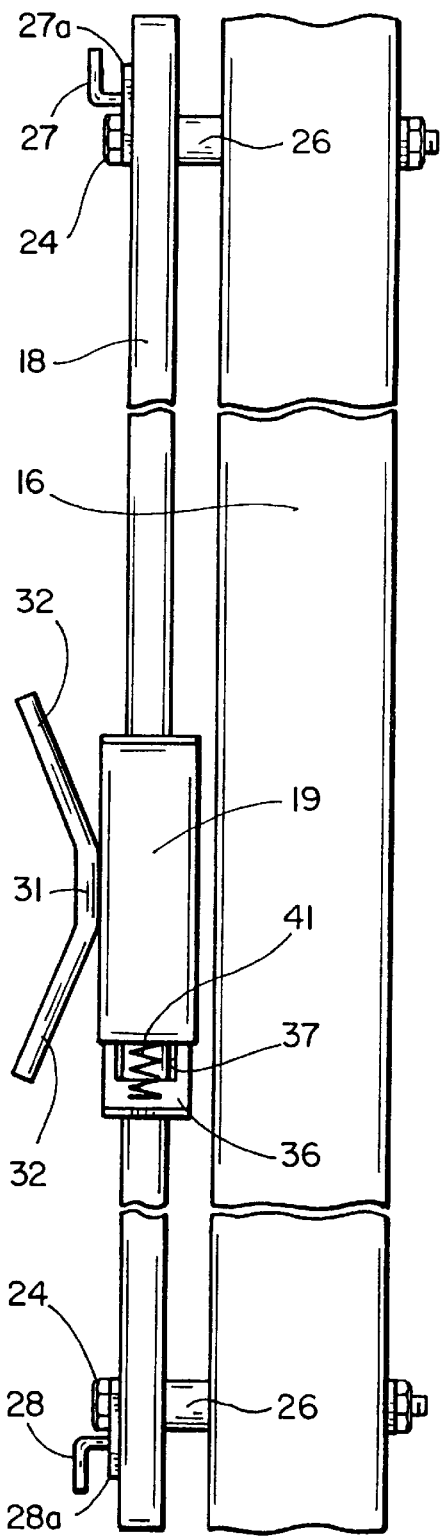
FIG_2

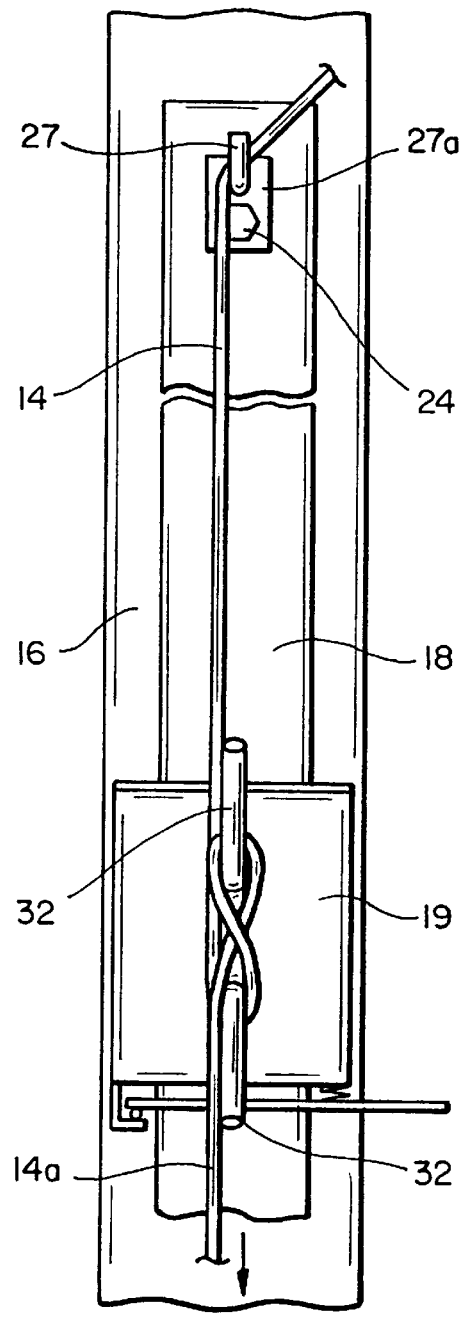
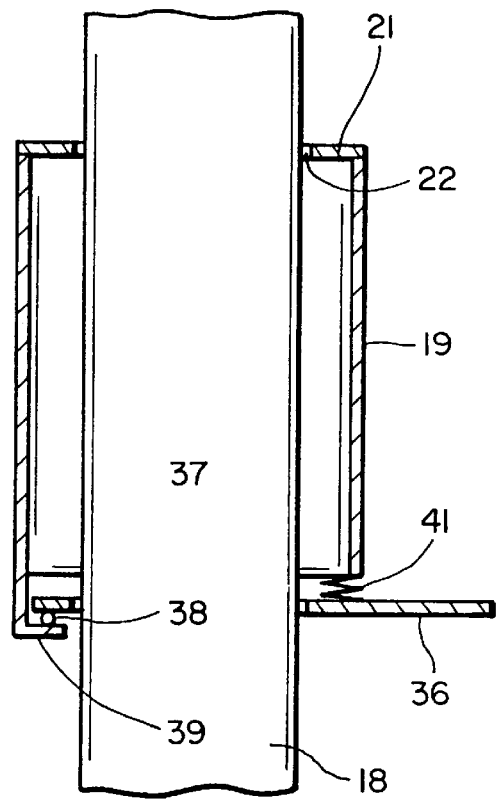
FIG_3
FIG_4

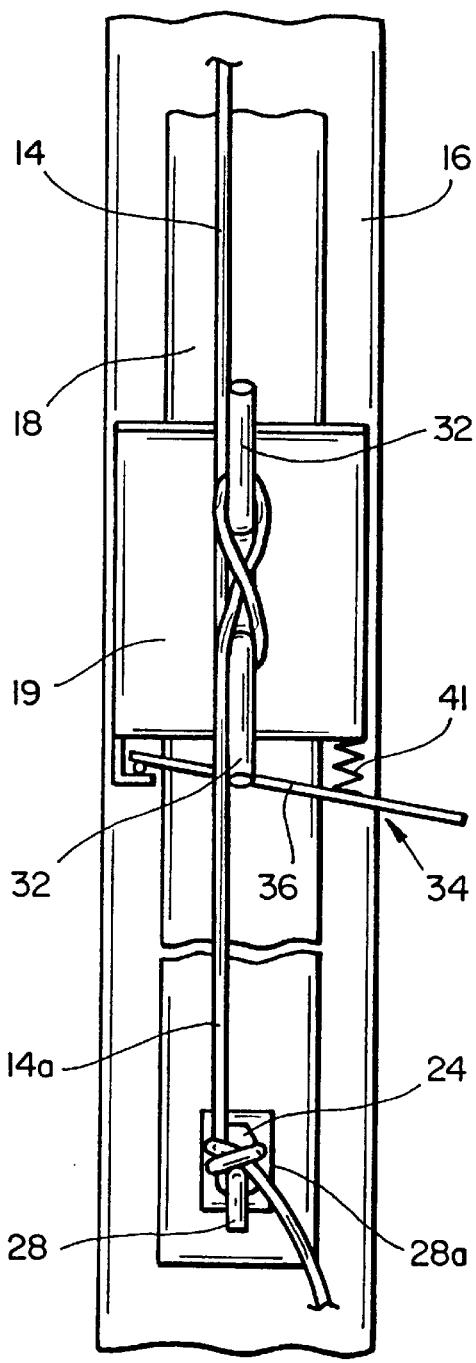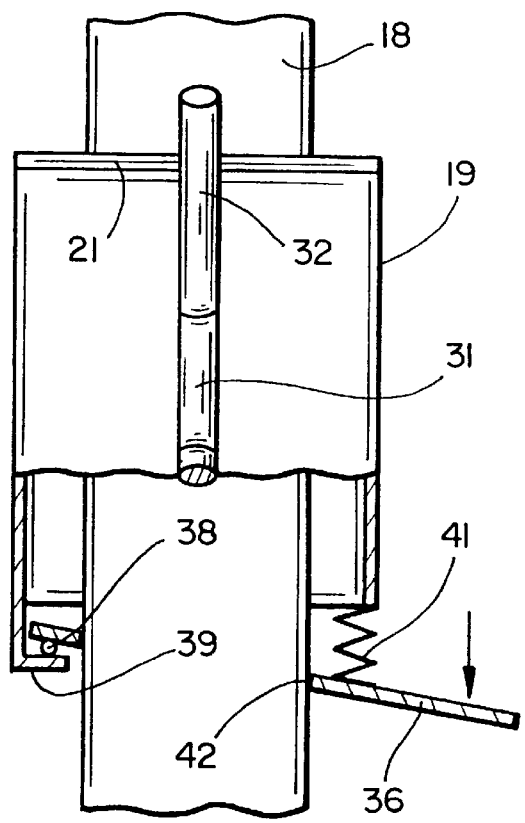

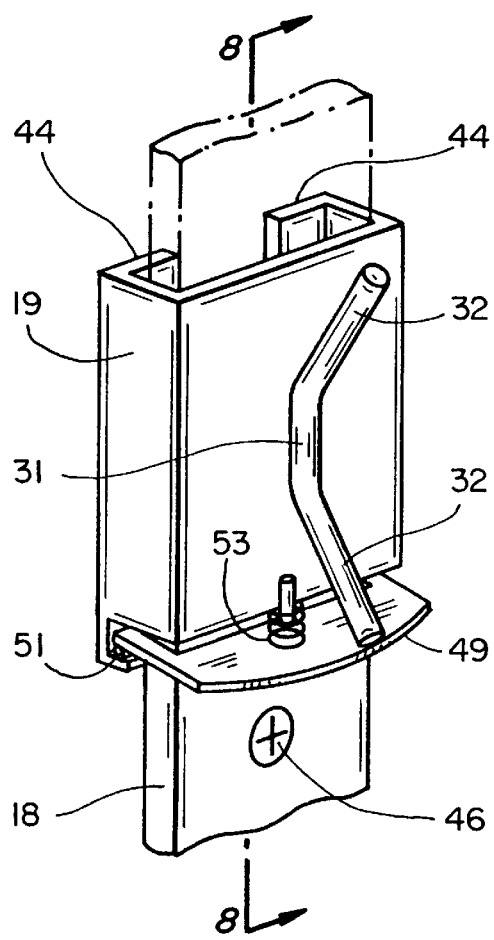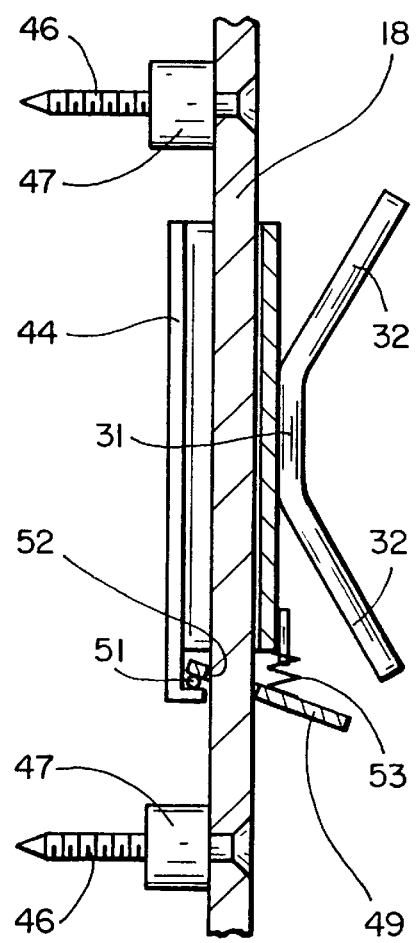
FIG_7  FIG_8

LINE TENSIONING APPARATUS AND METHOD

This invention pertains generally to the securement of loads on vehicles and the like and, more particularly, to an apparatus and method for tightening a line to secure a load.

Lines are commonly used for securing loads on the lumber racks of pick-up trucks as well as on other vehicles and vessels. In its simplest form, the line is wrapped about the load and tied to one or more fixed points on the vehicle or vessel. The problem with that approach is that it is difficult to tighten the line sufficiently to hold the load securely in position. Special knots have been devised for cinching the lines as the knots are tied, but such knots are complex and difficult to use.

A number of devices have heretofore been provided for tightening lines about loads. U.S. Pat. No. 4,174,119, for example, shows a jacking device on the post of lumber rack for tightening a rope. U.S. Pat. Nos. 1,713,238 and 2,628,397 show over-center devices for tightening hold-down lines, and U.S. Pat. Nos. 3,279,759, 4,510,652 and 5,338,136 show the use of winching devices for that purpose. U.S. Pat. Nos. 4,011,974 and 4,223,869 show screw-type devices for tightening cargo restraint lines. While such devices are generally capable of holding a load securely, they tend to be relatively complicated and difficult to use.

It is in general an object of the invention to provide a new and improved apparatus and method for tensioning a line.

Another object of the invention is to provide an apparatus and method of the above character which are suitable for use in securing loads to vehicles such as pick-up trucks.

These and other objects are achieved in accordance with the invention by providing an apparatus and method in which a slide is movable in first and second directions along an elongated bar, with a one-way brake on the slide engaging the bar and preventing movement of the slide in the second direction. The line is secured to the slide and then pulled to draw the slide in the first direction to tension the line, with the brake holding the slide where it is drawn to maintain tension in the line.

FIG. 1 is a fragmentary isometric view of one embodiment of a pick-up truck with a lumber rack and line tensioning apparatus incorporating the invention.

FIG. 2 is a side elevational view of the line tensioning apparatus in the embodiment of FIG. 1.

FIG. 3 is a fragmentary front elevational view of the line tensioning apparatus in the embodiment of FIG. 1.

FIG. 4 is a fragmentary vertical sectional view of the tensioning apparatus in the embodiment of FIG. 1, with the one-way brake in its released position.

FIG. 5 is a fragmentary front elevational view of the line tensioning apparatus in the embodiment of FIG. 1.

FIG. 6 is a fragmentary front elevational view of the tensioning apparatus in the embodiment of FIG. 1, with the one-way brake in its locking position.

FIG. 7 is a fragmentary isometric view of another embodiment of line tensioning apparatus according to the invention.

FIG. 8 is a cross-sectional view taken along line 8—8 in FIG. 7.

FIG. 9 is a diagrammatic view illustrating another method of tightening a line with the embodiments of FIGS. 1–8.

In the drawings, the invention is illustrated in conjunction with a pick-up truck 11 which has a lumber rack 12 on which a load 13 is carried. The load is secured to the rack with a line 14 in the form of a rope which is wrapped about the load. One end of the line is tied to a post 16 on the rack, and the other end is secured to the tensioning apparatus.

The tensioning apparatus includes an elongated bar 18 which is mounted in a fixed position on post 16 and a slide 19 which is movable in opposite directions along the bar. In the embodiment illustrated, the bar has a generally rectangular cross-section, and the slide comprises a generally rectangular sleeve which encircles the bar. A top plate 21 is affixed to the upper end of the sleeve, and has an opening 22 through which the bar extends. The opening is slightly larger than the bar so that the slide can move freely on the bar. In one presently preferred embodiment, both the bar and the sleeve are fabricated of soft steel, and the sleeve consists of a length of box tubing.

The bar is secured to the post by bolts 24 and spaced from the post by spacers 26. The spacers and bolts can be of any desired length which provides clearance for the slide. Hooks 27, 28 are mounted on the bolts toward the upper and lower ends of the bar. The hooks have mounting flanges 27a, 28a which are clamped beneath the heads of the bolts, and the hooks can be turned to any position desired.

Means is provided for securing the line to the slide. In the embodiment illustrated, this means comprises a cleat 31 which is affixed to the outer side of the slide and has a pair of horns or hooks 32 extending in opposite directions along the bar. If desired, other types of anchors can be used, such as a single hook or a mechanism for gripping the line.

A one-way brake 34 prevents movement of the slide in the upward direction while permitting it to move freely in the downward direction. The brake comprises a lock plate 36 which has an opening 37 through which the bar extends. One end of the lock plate rests on a fulcrum 38 carried by a flange 39 which depends from the lower side of the slide on one side of the bar, and a coil spring 41 on the other side of the bar urges the free end of the plate in a downward direction away from the slide. The lock plate is thus pivotally mounted on the slide for movement between locking and released positions, with the spring urging the plate toward the locking position.

The opening in the lock plate is slightly larger than the cross-section of the bar, and with the plate in the released position (FIG. 4), i.e. parallel to the lower edge of the slide and perpendicular to the axis of the bar, the plate moves freely along the bar. With the plate in the locking position (FIG. 6), i.e. skewed relative to the lower edge of the slide, the wall 42 of the opening binds against the bar on the side away from the fulcrum and prevents movement of the slide in the upward direction. When the slide moves in the downward direction, the free end of the plate is deflected toward the slide, and the bar passes freely through the opening. The brake can be released by manually depressing the free end of the plate in an upward direction toward the slide.

If greater holding strength is desired, one or more additional lock plates can be used. The additional plates can be similar to lock plate 36 and can be stacked on top of it, with fulcrum 38 serving as the fulcrum for the entire stack and spring 41 urging the entire stack toward the locking position. With a plurality of plates, each plate engages the bar and adds to the holding force when the brake is in the locking position. An even more positive lock can be provided by forming notches in the edge of the bar to serve as stops for the lock plate or plates. However, sufficient holding power is usually provided by the binding action of the plates, and the notches are generally not necessary.

Operation and use of the tensioning device, and therein the method of the invention, are as follows. After being tied to the post and wrapped about the load, the line is drawn around the lower horn of the cleat and secured to the cleat with a suitable knot such as a figure-8 knot. The free end 14a of the line is then pulled in a downward direction to tighten the line and draw the slide down, as illustrated in FIG. 3. The one-way brake on the slide permits the slide to move in that direction, but prevents it from moving back up, thereby maintaining the tension in the line. If desired, the line can be tightened further by untying it from the cleat, drawing it tighter, then tying it to the cleat again and pulling down again on the free end.

As the line is being brought to the cleat, it can be trained about hook 27 at the upper end of the bar, with the hook serving as a guide for directing the line to the slide in a direction generally parallel to the bar. That assures that the pull of the line will be directly in line with the travel of the slide, which keeps the slide in proper alignment with the bar and prevents binding as the slide travels in the downward direction. It also applies the maximum component of the force from the line to the slide, which draws the lock plate tighter against the bar and provides a better braking action against movement in the upward direction.

Once the line has been tightened to the desired extent, the free end of the line can be tied to hook 28 toward the lower end of the bar, as illustrated in FIG. 5, to prevent the load from being released in the event that the brake is inadvertently disengaged, e.g. by someone bumping the free end of the lock plate. Alternatively, the free end can be trained about hook 28, then brought back up to the slide and tied to the cleat with a second figure-8 knot.

The line can be released quickly and easily by untying the free end and depressing the lock plate to disengage the brake, thereby allowing the slide to move in an upward direction. With the line relaxed, it can be untied from either the cleat or the post, or both.

In the embodiment of FIG. 7, the back of the slide 19 is open, and a pair of flanges 44 extend behind the lateral margins of the bar 18 to keep the slide on the bar. The bar is mounted to a post (not shown) or other support by screws 46 and spacers 47. The heads of the screws are countersunk into the front side of the bar, so that the slide can pass freely over them as it travels along the bar, with the spacers on the screws passing through the opening between the flanges at the rear of the slide. With this arrangement, the bar can be of any length desired, and the mounting screws will not limit travel of the slide.

In this embodiment, lock plate 49 rests on fulcrums 51 at the lower ends of flanges 44, with an opening 52 through which the bar passes. The free end of the plate is positioned in front of the bar, and a coil spring 53 urges the free end in a downward direction toward the locking position. As in the embodiment of FIG. 1, the free end serves as a lever which can be depressed manually toward the slide to release the brake.

With the free end of the lock plate extending to the front of the bar instead of the side, this embodiment can be mounted in a channel, as found on some lumber racks, where a lever extending to the side could not be employed.

Operation and use of the embodiment of FIG. 7 is similar to that of the embodiment of FIG. 1, the only significant difference being that the release lever for the brake extends in front of the bar rather than to the side.

FIG. 9 illustrates a technique which can be employed with either the embodiment of FIG. 1 or the embodiment of FIG. 7 in order to obtain a further mechanical advantage in tightening the line. As before, line 14 is tied to cleat 31, and a downward pull is exerted on the free end 14a of the line to tension the line and tighten it about the load. Thereafter, the free end of the line is trained about lower hook 28, then about the upper horn of the cleat, with the remaining portion of the free end hanging down from the cleat. With the line thus trained, pulling down on the free end now provides a 2:1 mechanical advantage for drawing the cleat in a downward direction to further tighten the line.

To prevent inadvertent release of the line, the free end can be tied either to the hook or to the cleat. Tying the line to the cleat is particularly easy in this embodiment since the line is already trained about the upper horn, and all that needs to be done to complete a figure-8 knot is to form a reverse loop about the lower horn and pull it tight.

Although the invention has been described with specific reference to use on the lumber rack of a pick-up truck, it can be used in other line tensioning applications as well. On a truck without a rack, for example, it can be mounted in a horizontal position on the side of the bed and used for tightening a line about a load in the bed. In some applications, the slide can be mounted directly on a post or other supporting member, with the post or supporting member serving as the bar on which the slide moves.

The invention has a number of important features and advantages. It enables a line to be tightened and released quickly and easily, while automatically maintaining tension in the line. The line is tightened simply by pulling on it, with no cranks or other external parts to manipulate. The device can be manufactured economically and used in a variety of applications. It is readily installed on existing racks as well as on new ones.

It is apparent from the foregoing that a new and improved apparatus and method for tensioning a line have been provided. While only certain presently preferred embodiments have been described in detail, as will be apparent to those familiar with the art, certain changes and modifications can be made without departing from the scope of the invention as defined by the following claims.

What is claimed is:

1. Apparatus for use in tensioning a line, comprising: an elongated bar, a slide movable along the bar in first and second directions, a one-way brake on the slide which engages the bar and prevents movement of the slide in the second direction, and an anchor carried by the slide to which the line can be secured and then pulled to draw the slide in the first direction to tension the line, with the brake holding the slide where it is drawn to maintain tension in the line.

2. The apparatus of claim 1 wherein the slide is slidably mounted on the bar.

3. The apparatus of claim 1 including a guide positioned toward one end of the bar for directing the line to the slide in a direction generally parallel to the bar.

4. The apparatus of claim 1 wherein the brake comprises a pivotally mounted lock plate which passes freely along the bar when the slide moves in the first direction.

5. The apparatus of claim 4 including means yieldably urging the lock plate into binding engagement with the bar.

6. The apparatus of claim 4 wherein the lock plate can be manually disengaged from the bar.

7. The apparatus of claim 1 wherein the anchor comprises a cleat to which the line can be tied.

8. The apparatus of claim 1 including a safety hook to which a free end of the line can be secured to prevent movement of the slide in the second direction in the event that the brake is inadvertently released.

9. Apparatus for securing a load to a lumber rack on a pick-up truck, comprising: a bar adapted to be mounted in a fixed position on the lumber rack, a cleat slidably mounted on the bar, a line adapted to be wrapped about the load and secured to the cleat, with a portion of the line being free to be pulled to tension the line and draw the cleat along the bar in a first direction, and a one-way brake which permits the cleat to move in the first direction and prevents movement of the cleat in an opposite direction.

10. The apparatus of claim 9 wherein the cleat is mounted on a block which slides on the bar, and the brake comprises a lock plate having one end pivotally mounted to the block on one side of the bar, an opening through which the bar extends, and a free end on the side of the bar opposite the pivot, the plate being movable between a released position perpendicular to the bar in which the bar passes freely through the opening and a locking position in which the plate is skewed relative to the bar with a wall of the opening engaging the side of the bar opposite the pivot to prevent movement of the block in the opposite direction.

11. The apparatus of claim 10 including means yieldably urging the plate toward the locking position.

12. The apparatus of claim 9 wherein the bar is adapted to be mounted in a vertical position on a post of the lumber rack.

13. The apparatus of claim 12 wherein the free portion of the line is secured to a safety hook toward the lower end of the bar.

14. The apparatus of claim 12 wherein the line is trained about a guide toward the upper end of the bar and extends in a direction generally parallel to the bar between the guide and the cleat.

15. Line tensioning apparatus for use in securing a load, comprising: an elongated bar, a slide movable along the bar in first and second directions, a one-way brake on the slide which engages the bar and prevents movement of the slide in the second direction, a line adapted to be wrapped about the load, and an anchor carried by the slide to which the line can be secured and then pulled to draw the slide in the first direction to tighten the line against the load, with the brake holding the slide where it is drawn to maintain tension in the line.

16. Line tensioning apparatus for use in securing a load, comprising: a cleat slidably mounted on a bar, a line wrapped about the load and secured to the cleat, with a portion of the line being free to be pulled to draw the cleat along the bar in a first direction and thereby tension the line, and a one-way brake which permits the cleat to move in the first direction but prevents movement of the cleat in an opposite direction.

17. Line tensioning apparatus, comprising: a cleat mounted on a bar for movement in first and second directions along the bar, a line secured to the cleat, means for drawing the cleat along the bar in a first direction to tension the line, and a one-way brake which permits the cleat to move in the first direction and prevents movement of the cleat in an opposite direction.

18. The line tensioning apparatus of claim 17 wherein the means for drawing the cleat along the bar in the first direction comprises a free end of the line.

19. The line tensioning apparatus of claim 17 wherein the one-way brake comprises a pivotally mounted lock plate which passes freely along the bar when the cleat moves in the first direction but engages the bar in binding relationship to prevent movement of the cleat in the second direction.

* * * * *